(12) United States Patent
Lee (10) Patent No.: US 10,520,299 B2
(45) Date of Patent: Dec. 31, 2019

(54) APPARATUS FOR MEASURING CONVERGENCE USING FBG SENSOR AND SENSITIVITY AND DURABILITY REGULATION METHOD THEREOF

(71) Applicant: FBG KOREA INC., Gwangju (KR)

(72) Inventor: Geum Suk Lee, Daejeon (KR)

(73) Assignee: FBG KOREA INC., Gwangju (KR)

( * ) Notice: Subject to any disclaimer, the term of this patent is extended or adjusted under 35 U.S.C. 154(b) by 222 days.

(21) Appl. No.: 15/532,427

(22) PCT Filed: Dec. 20, 2016

(86) PCT No.: PCT/KR2016/014909
§ 371 (c)(1),
(2) Date: Jun. 1, 2017

(87) PCT Pub. No.: WO2018/117284
PCT Pub. Date: Jun. 28, 2018

(65) Prior Publication Data
US 2018/0364029 A1    Dec. 20, 2018

(30) Foreign Application Priority Data
Dec. 19, 2016  (KR) .......................... 10-2016-0173841

(51) Int. Cl.
*G01B 11/16* (2006.01)
*G01L 1/24* (2006.01)
(Continued)

(52) U.S. Cl.
CPC ............ *G01B 11/165* (2013.01); *G01B 11/18* (2013.01); *G01L 1/246* (2013.01); *G01L 11/025* (2013.01);
(Continued)

(58) Field of Classification Search
CPC ......... G01B 11/165; G01B 11/18; G01L 1/24; G01L 1/246; G01L 11/02; G01L 11/025;
(Continued)

(56) References Cited

U.S. PATENT DOCUMENTS

2006/0070446 A1* 4/2006 Tam ...................... G01L 11/025
73/705
2009/0123110 A1* 5/2009 Park ...................... G01K 1/143
385/13
(Continued)

FOREIGN PATENT DOCUMENTS

JP     2003214907 A    7/2003
KR   10-0992628 B1   11/2010
(Continued)

*Primary Examiner* — Dominic J Bologna
(74) *Attorney, Agent, or Firm* — Novick, Kim & Lee, PLLC; Jae Youn Kim (57) ABSTRACT

Disclosed are an apparatus for measuring a displacement using a fiber Bragg grating sensor, which is applied to a strain sensor using the fiber Bragg grating sensor, and a method of controlling sensitivity and durability of the same. The apparatus includes: a case forming an external appearance; third and fourth optical fibers having mutually different numbers of strands and installed in the case while being spaced apart from each other by a predetermined interval; and a connection unit installed between the third and fourth optical fibers and fixed at a predetermined position by tension applied to the third and fourth optical fibers, wherein the fiber Bragg grating sensor is installed to one selected from the pair of optical fibers having mutually different numbers of strands, so that measurement sensitivity and durability are controllable.

7 Claims, 7 Drawing Sheets (51) Int. Cl.
  *G01M 11/08* (2006.01)
  *G02B 6/02* (2006.01)
  *G01L 11/02* (2006.01)
  *G01P 15/093* (2006.01)

(52) U.S. Cl.
  CPC ......... *G01M 11/088* (2013.01); *G01P 15/093* (2013.01); *G02B 6/02* (2013.01); *G02B 6/02076* (2013.01)

(58) Field of Classification Search
  CPC . G01M 11/085; G01M 11/088; G01P 15/093; G02B 6/02; G02B 6/02076
  See application file for complete search history.

(56) References Cited

U.S. PATENT DOCUMENTS

2016/0187515 A1\* 6/2016 De Jong ............... G01L 11/025
  367/15
2018/0171778 A1\* 6/2018 Hoehn ............... G01D 5/35374
2018/0364122 A1\* 12/2018 Karabacak ............ G01L 11/025

FOREIGN PATENT DOCUMENTS

KR   10-1057309 B1   8/2011
WO   2006115511 A1   11/2006

\* cited by examiner

FIG. 7

APPARATUS FOR MEASURING CONVERGENCE USING FBG SENSOR AND SENSITIVITY AND DURABILITY REGULATION METHOD THEREOF

TECHNICAL FIELD

The present invention relates to an apparatus for measuring a displacement using a fiber Bragg grating sensor, and more particularly, to an apparatus for measuring a displacement using a fiber Bragg grating sensor which is flexible to a displacement of a measurement object and a method of controlling sensitivity and durability of the same.

BACKGROUND ART

In general, an optical fiber sensor is a sensor which estimates a measured amount by using intensity of light passing through an optical fiber, a refractive index and a length of the optical fiber, a mode and a variation in polarization.

A main component of an optical fiber is quartz glass. An optical fiber sensor includes a core positioned at a central portion of the optical fiber and added with germanium to slightly increase a refractive index, and cladding which is layers covering the core to protect the core.

The light incident upon the optical fiber core is reflected on the interface between a high-refractive core layer and a low-refractive cladding layer to propagate along the optical fiber core.

The optical fiber sensor is classified as an intention type, a phase type, a diffraction grating type, a mode modulation type, a polarization type, a distribution measurement type, etc., and provides various measurement values such as a voltage, a current, temperature, pressure, strain, a rotation rate, sound, a gas concentration, etc.

The optical fiber sensor can perform a super-precise wideband measurement and is not influenced by electromagnetic waves. In addition, the optical sensor easily performs a remote measurement, and a sensor part thereof does not use electricity. The optical fiber is made of a silica material having excellent decay resistance so that the optical fiber is not limited by a use environment.

There is an optical sensor of a fiber Bragg grating sensor type as a typical optical fiber sensor.

The fiber Bragg grating sensor is a sensor that includes several Bragg gratings formed on one strand of an optical fiber while be spaced part from each other by a predetermined interval and uses a property that the wavelength of light reflected on each grating is changed according to a variation of external condition such as temperature or strength.

Thus, when the fiber Bragg grating sensor is deformed when physical force is operated on the optical fiber having the gratings, so that the light refraction on the gratings are changed. The strain of a structure to which the optical fiber is fixed is measured by measuring the strain of the optical fiber through the refraction measurement, so that the load and stress on the structure may be sensed.

The fiber Bragg grating sensor, of which the refractive index of the core of the optical fiber is changed to have a predetermined period, selectively reflects only a specific wavelength of light.

The fiber Bragg grating sensor has a typical wavelength value and is not influenced by electromagnetic waves. In addition, the fiber Bragg grating sensor, which is an excellent physical quantity measurement device, has been substituted for a conventional electric gage, and the application scope thereof has been widened.

Thus, the fiber Bragg grating sensor has been used as a sensor for sensing strain, an angle, acceleration, a displacement, temperature, a variation in pressure, etc., by using a total-reflection principle that the light in an angle range is fully reflected on the interface when light propagates from high-refractive material to a low-refractive material.

For example, several techniques using an FBG sensor have been disclosed in Patent Document 1 (Korean Patent Registered No. 10-1057309 issued on Aug. 16, 2011) and Patent Document 2 (Korean Patent Registered No. 10-00992628 issued on Nov. 5, 2010) by the same applicant as the present application.

DISCLOSURE

Technical Problem

In general, an energy loss of an optical fiber is very small, so that the loss rate of transmitted/received data is very low and the optical fiber is not almost influenced by external factors.

The coefficient of expansion of the optical fiber is about $1/20$ times of iron, so that the optical fiber is easily broken when the elongation percentage thereof is about 3% to 5% or more.

Specifically, while the tension per unit area of the fiber Bragg grating sensor is very high, since the diameter of the fiber Bragg grating sensor is about 125 μm, the fiber Bragg grating sensor may be easily broken due to external impact, so that a very sophisticated work is required when the fiber Bragg grating sensor is attached to a measurement object such as a building, a bridge, etc.

That is, if the elongation percentage of the fiber Bragg grating sensor is about 0.5% to 1% or more, due to the manufacturing process, the fiber Bragg grating sensor may be broken or damaged.

Therefore, there is a need to a technique of preventing a fiber Bragg grating sensor from being broken or damaged in consideration of the characteristics of the fiber Bragg grating sensor such as sensitivity, durability and the like.

Meanwhile, the fiber Bragg grating sensor may show a different wavelength due to the variation of the refractive index with change in temperature.

For this reason, according to the related art, although a pair of metal bars are collinearly installed in a case and a fiber Bragg grating sensor for compensating temperature is installed between the pair of metal bars, when the metal bars are thermally deformed, the accuracy is deteriorated and it is impossible to precisely compensate the temperature.

To solve the problems described above, one object of the present invention is to provide an apparatus for measuring a displacement using a fiber Bragg grating sensor, which measures a displacement using a fiber Bragg grating sensor which is flexible to a displacement of a measurement object.

Another object of the present invention is to provide an apparatus for measuring a displacement using a fiber Bragg grating sensor, which may be prevented from being broken and damaged by controlling the sensitivity and the durability of the fiber Bragg grating sensor, and a method of controlling sensitivity and durability of the same.

Still another object of the present invention is to provide an apparatus for measuring a displacement using a fiber Bragg grating sensor, which may compensate a variation of a refractive index of the fiber Bragg grating sensor caused by a variation in temperature, and a method of controlling sensitivity and durability of the same Technical Solution To achieve the objects, in accordance with an aspect of the present invention, there is provided an apparatus for measuring a displacement using a fiber Bragg grating sensor, which is applied to an acceleration sensor using the fiber Bragg grating sensor. The apparatus includes: a case forming an external appearance; first and second optical fibers installed in the case in a vertical direction while being spaced apart from each other by a predetermined interval; and a weight applying unit installed between the first and second optical fibers to apply a weight to the first and second optical fibers, wherein a degree and a direction of acceleration are measured by using a variation of a wavelength output from a fiber Bragg grating sensor installed to the first and second optical fibers as the weight applying unit moves upwardly or downwardly due to a vibration of a measurement object.

In accordance with another aspect of the disclosure, there is provided an apparatus for measuring a displacement using a fiber Bragg grating sensor, which is applied to a strain sensor using the fiber Bragg grating sensor. The apparatus includes: a pair of attachment members spaced apart from each other by a predetermined interval; third and fourth optical fibers installed between the pair of attachment members in a horizontal direction; and a connection unit installed between the third and fourth optical fibers and fixed at a predetermined position by tension applied to the third and fourth optical fibers, wherein the fiber Bragg grating sensor is installed to one selected from the third and fourth optical fibers having mutually different numbers of strands, so that measurement sensitivity and durability are controllable.

In accordance with still another aspect of the present invention, there is provided a method of controlling sensitivity and durability of an apparatus for measuring a displacement using a fiber Bragg grating sensor, wherein the fiber Bragg grating sensor is installed to one selected from a pair of optical fibers which include mutually different numbers of strands and are installed at both sides of a connection unit, such that measurement sensitivity and durability of the fiber Bragg grating sensor are controllable.

As described above, according to an apparatus for measuring a displacement using a fiber Bragg grating sensor, the weight applying unit is installed between the pair of optical fibers installed in parallel to each other, such that an acceleration may be measured by using changes of the tension and compressive force applied to the pair of optical fibers when vibration is generated.

In addition, according to an apparatus for measuring a displacement using a fiber Bragg grating sensor and a method of controlling sensitivity and durability of the same of the present invention, the fiber Bragg grating sensor is installed to one selected from the pair of optical fibers having mutually different numbers of strands, so that the measurement sensitivity and the durability of the strain sensor may be improved.

Thus, according to the present invention, a fiber Bragg grating sensor may be installed to one of a pair of optical fibers, which has a number of strands less than a number of strands of the other in order to increase sensitivity of a displacement measurement of a measurement object, so that the measurement sensitivity may be improved.

Alternatively, according to the present invention, a fiber Bragg grating sensor may be installed to one of a pair of optical fibers, which has a number of strands larger than a number of strands of the other in order to increase durability of the optical fiber and the fiber Bragg grating sensor.

In addition, according to the present invention, the fifth optical fibers to which the temperature-compensation fiber Bragg grating sensor is prepared may be loosely installed to at least two of the connection unit installed between the pair of attachment members and the third and fourth installation members, such that the compensation value for a variation in temperature is precisely adjusted.

In addition, according to the present invention, a length ratio between a pair of optical fibers having mutually different numbers of strands may be adjusted to adjust the actual strain of each optical fiber.

In addition, according to the present invention, the strain sensor may be installed onto an uneven attachment surface of an measurement object, a curved surface such as a tunnel, or a bottom surface warped in left and right directions by using the sensor fixing device as well as a flat type measurement object, so that a displacement of the measurement object is precisely measured.

BEST MODE

Mode for Invention

Hereinafter, an apparatus for measuring a displacement using a fiber Bragg grating sensor which is flexible to a displacement of a measurement object and a method of controlling sensitivity and durability of the same according to a preferable embodiment of the present invention will be described in detail with reference to accompanying drawings.

The present invention controls the sensitivity and durability of the optical fiber grating sensor while a displacement is measured by using the optical fiber grating sensor flexible to the displacement of the measurement object, so that the present invention may prevent the fiber Bragg grating sensor from being damaged.

Hereinafter, the configurations of an acceleration sensor and a strain sensor using a fiber Bragg grating sensor will be described in detail through following Embodiment 1 and Embodiment 2.

Embodiment 1

Figure 1:
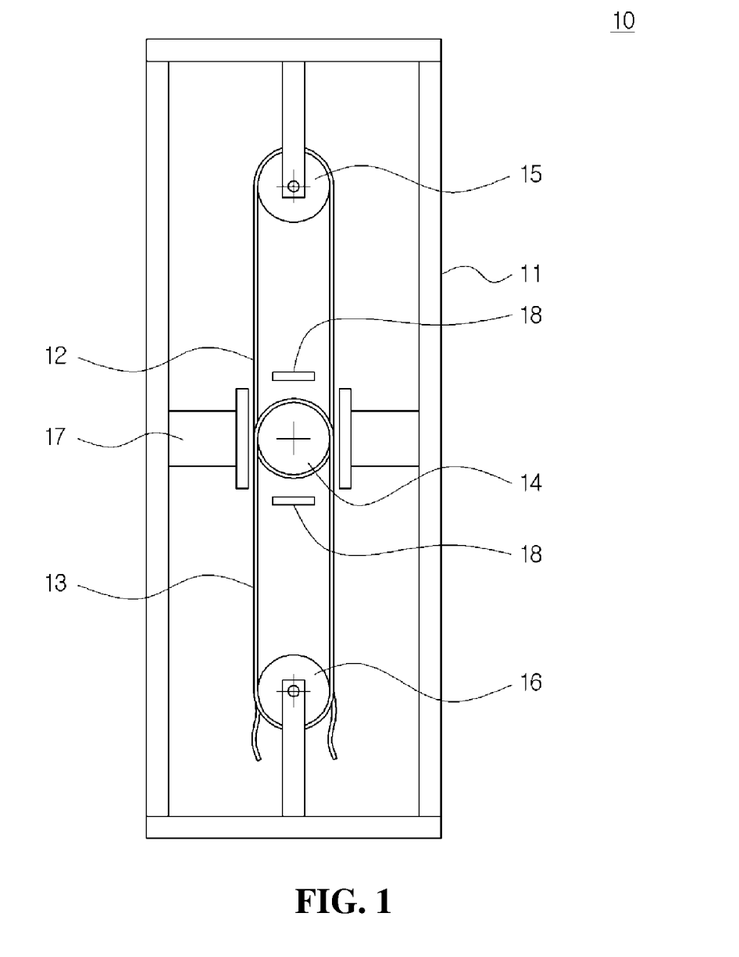
FIG. 1 is a view illustrating the configuration of an acceleration sensor using a fiber Bragg grating sensor according to a first embodiment of the present invention.

FIG. 1 is a view illustrating the configuration of an acceleration sensor using a fiber Bragg grating sensor according to a first embodiment of the present invention.

Terms indicating directions such as 'left', 'right', 'forward', 'rearward', 'upward', 'downward' and the like are defined based on the depicted states in the drawings.

As shown in FIG. 1, an acceleration sensor 10 using a fiber Bragg grating sensor according to the first embodiment of the present invention includes a case 11 forming an appearance thereof, first and second optical fibers 12 and 13 installed in the case 11 while being spaced apart from each other by a predetermined interval, and a weight applying unit 14 installed between the first and second optical fibers 12 and 13 to apply a weight to the first and second optical fibers 12 and 13.

The case 11 may be formed in a shape of a rectangular parallelepiped having a height longer than a width and a length thereof, and may be attached to or fixed to a measurement object with a bolt.

First and second installation members 15 and 15, to which the first and second optical fibers 12 and 13 are installed, may be provided between upper and lower ends of the case 11.

The first and second installation members 15 and 16 may be formed in a circular disc shape such that the first and second optical fibers 12 and 13 are prevented from being damaged or deformed during or after installation of them.

The first and second optical fibers 12 and 13 may be installed in parallel to each other in a vertical direction in the case 11 while being spaced apart from each other by a predetermined interval. At least one fiber Bragg grating sensor (not shown) may be mounted on at least one of the first and second optical fibers 12 and 13.

The weight applying unit 14 may be prepared at a predetermined weight and may be attached to central portions of the first and second optical fibers 12 and 13.

In this case, the weight applying unit 14 may be formed in a hexahedral shape or a circular disc shape.

That is, when the weight applying unit 14 is formed in the circular disc shape, the first and second optical fibers 12 and 13 may be attached to an outer circumference surface of the weight applying unit 14 or may be wound at least half around the outer circumference surface of the weight applying unit 14.

In this case, guides 17 may be installed at the left and right sides of the weight applying unit 14, respectively to prevent the weight applying unit 14 from moving in left and right directions.

In addition, displacement restriction units 18 may be installed at the upper and lower sides of the weight applying unit 14 to restrict a displacement of the weight applying unit 14 such that the optical fibers are prevented from being damaged due to an excessive displacement of the weight applying unit 14.

The first and second optical fibers 12 and 13 may be wound mutually different numbers of times to have the mutually different numbers of strands.

For example, the first optical fiber 12 may be wound half around the first installation member 15 and the weight apply unit 14 such that the first optical fiber 12 includes total two strands, and the second optical fiber 13 may be wound once around the second installation member 16 and the weight apply unit 14 such that the second optical fiber 13 includes total four strands.

As described above, since the weight applying unit 14 is installed between the first and second optical fibers 12 and 13, so that tension is generated on upper portions of the first and second optical fibers 12 and 13 due to the weight of the weight applying unit 14 and compressive force is generated on lower portions of the first and second optical fibers 12 and 13 due to the weight of the weight applying unit 14.

Meanwhile, when the weight applying unit 14 vibrates in a vertical direction, tension and compressive force may be alternatively generated on the first and second optical fibers 12 and 13.

For example, when the weight applying unit 14 moves upwardly, the tension applied to the upper portions of the first and second optical fibers 12 and 13 is removed and the compressive force is applied to the upper portions of the first and second optical fibers 12 and 13. In addition, the compressive force is removed from the lower portions of the first and second optical fibers 12 and 13 and the tension is applied to the lower portions of the first and second optical fibers 12 and 13.

When the weight applying unit 14 moves downwardly, the compressive force applied to the upper portions of the first and second optical fibers 12 and 13 is removed and the tension is applied to the upper portions of the first and second optical fibers 12 and 13. In addition, the tension is removed from the lower portions of the first and second optical fibers 12 and 13 and the compressive force is applied to the lower portions of the first and second optical fibers 12 and 13.

Therefore, a total of four fiber Bragg grating sensors are installed on the upper and lower portions of the first and second optical fibers, respectively, the direction and magnitude of an acceleration may be accurately measured by using changes of wavelengths output from the fiber Bragg grating sensors due to vibration.

As described above, according to the present invention, the weight applying unit is installed between the pair of optical fibers installed in parallel to each other, such that an acceleration may be measured by using changes of the tension and compressive force applied to the pair of optical fibers when vibration is generated.

Embodiment 2

Figure 2:
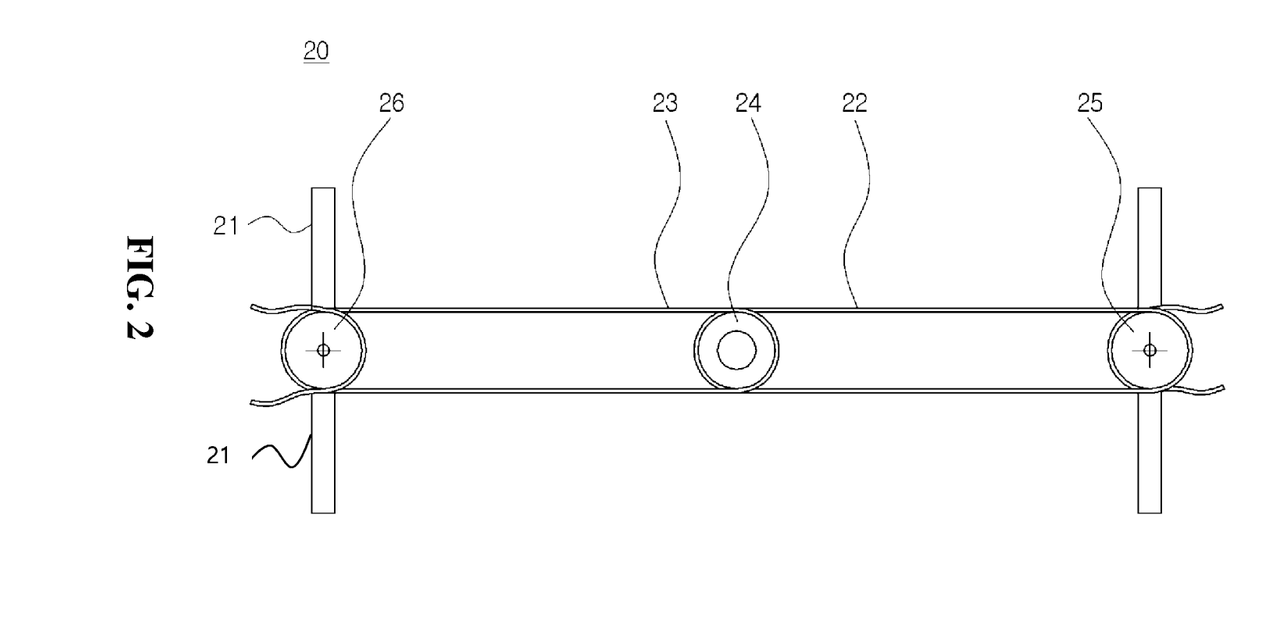
FIG. 2 is a front view illustrating a strain sensor using a fiber Bragg grating sensor according to a second embodiment of the present invention.
Figure 3:
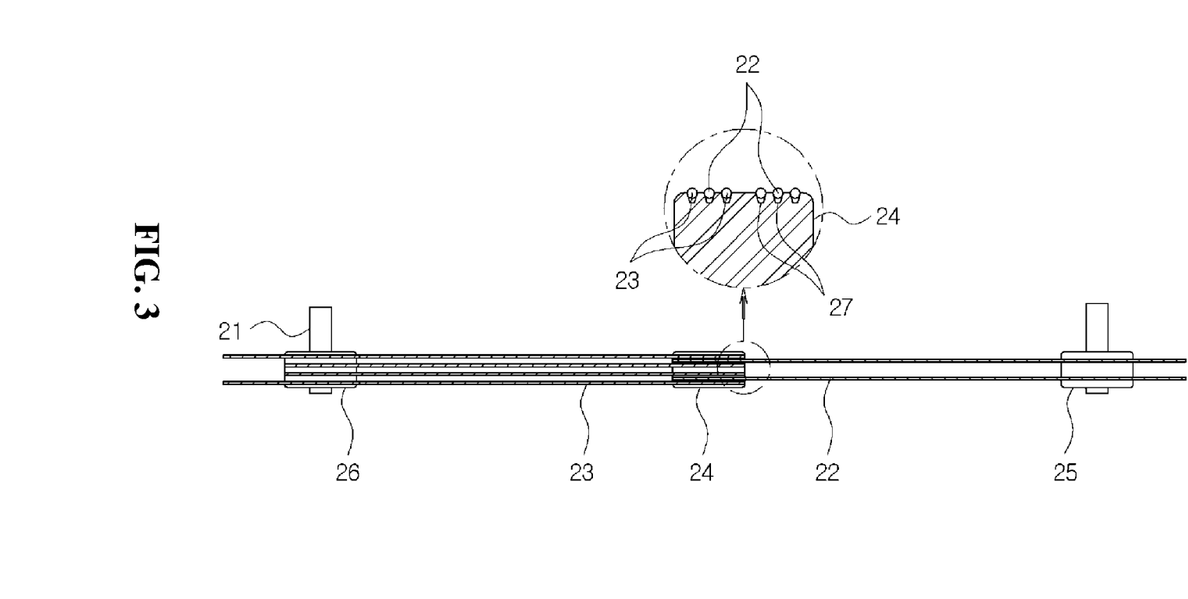
FIG. 3 is a plan view of the strain sensor depicted in FIG. 2.

FIG. 2 is a front view illustrating a strain sensor using a fiber Bragg grating sensor according to a second embodiment of the present invention. FIG. 3 is a plan view of the strain sensor depicted in FIG. 2.

As shown in FIGS. 2 and 3, a strain sensor 20 using a fiber Bragg grating sensor according to the second embodiment of the present invention includes a pair of attachment members 21 spaced apart from each by a predetermined interval, third and fourth optical fibers 22 and 23 installed between the pair of attachment members 21 in a horizontal direction, and a connection unit 24 installed between the third and fourth optical fibers 22 and 23 and fixed at a position by the tension applied to the third and fourth optical fibers 22 and 23.

Each of the attachment members 21 may be formed substantially in a rectangular plate or parallelepiped shape, and may be attached to or fixed to a measurement object with a bolt.

Third and fourth installation members 25 and 26, to which the third and fourth optical fibers 22 and 23 are installed, may be provided to the pair of attachment members 21.

The third and fourth installation members 25 and 26 may be formed in a circular disc shape such that the third and fourth optical fibers 22 and 23 are prevented from being damaged or deformed during or after installation of an optical fiber and a fiber Bragg grating sensor.

The third and fourth optical fibers 22 and 23 may be installed between the pair of attachment members 21 in a horizontal direction and at least one fiber Bragg grating sensor (not shown) may be installed to the third and fourth optical fibers 22 and 23.

The connection unit 24 may be formed of a light metal material such as aluminum or a synthetic resin material in a circular disc shape or a ring shape to minimize the load applied to the third and fourth optical fibers 22 and 23.

In this case, a plurality of installation grooves 27, in which strands of the third and fourth optical fibers 22 and 23 are installed, may be formed on outer circumference surfaces of the connection unit 24 and the third and fourth installation members 25 and 26.

The installation grooves 27 each may be formed in a V-shape to increase friction between the strands of the third and fourth optical fibers 22 and 23 and the outer circumference surfaces of the connection unit and the third and fourth installation members 25 and 26, such that each strand is fixed.

That is, the strands of the third and fourth optical fibers 22 and 23 make line-contact with each other through two lines in the V-shaped installation grooves 27, so that friction between the third and fourth optical fibers 22 and 23, the connection unit 24 and the third and fourth installation members 25 and 26 may be increased.

Of course, the present invention is not limited to the above. The low end of the installation groove 27 may be formed to be flat such that the installation groove 27 makes line-contact with three lines. Alternatively, the installation groove 27 may be formed in a semicircular shape or a U shape to make surface-contact.

Thus, the third and fourth optical fibers 22 and 23 may be wound half around the outer circumference surfaces of the connection unit 24 and the third and fourth installation members 25 and 26, each of which is formed in a circular disc shape.

Specifically, the third and fourth optical fibers 22 and 23 may be wound mutually different numbers of times and strands.

For example, as shown in FIGS. 2 and 3, the third optical fiber 22 may be wound once around the third installation member 25 and the connection unit 24 such that the third optical fiber 22 includes total four strands, and the fourth optical fiber 23 may be wound twice around the fourth installation member 26 and the connection unit 24 such that the fourth optical fiber 23 includes total eight strands.

In this case, the strains of the third and fourth optical fibers 22 and 23 vary with a ratio between lengths or cross-sectional areas of the third and fourth optical fibers 22 and 23. The lengths and diameters of the third and fourth optical fibers 22 and 23 according to the embodiment may be set to be equal to each other.

Of course, the present invention is not limited to the above. The third optical fiber 22 may have one strand or more and the fourth optical fiber 23 may have two strands or more, so that the third and fourth optical fibers 22 and 23 have mutually different numbers of strands.

As described above, although the third and fourth optical fibers 22 and 23 have mutually different numbers of strands, the tension of the third optical fiber 22 is equal to that of the fourth optical fiber 23 and the tension of each strand of the third and fourth optical fibers 22 and 23 is changed according to the number of strands of each of the third and fourth optical fibers 22 and 23.

That is, when the third and fourth optical fibers 22 and 23 have four strands and eight strands, respectively, the tension of each strand of the third optical fiber 22 is twice that of each strand of the fourth optical fiber 23.

Table 1 is a table showing an amount of variation with tension of an optical fiber.

TABLE 1

| Tension (g) | Variation in wavelength (nm) | Rate of length change (με) |
|---|---|---|
| 0 | 0.00 | 0 |
| 50 | 0.66 | 549 |
| 100 | 1.32 | 1099 |
| 150 | 1.98 | 1648 |
| 200 | 2.64 | 2197 |
| 250 | 3.30 | 2747 |
| 300 | 3.96 | 3296 |
| 360 | 4.61 | 3945 |
| 400 | 5.27 | 4395 |
| 450 | 5.93 | 4944 |
| 500 | 6.59 | 5493 |
| 550 | 7.25 | 6043 |
| 600 | 7.91 | 6592 |

Table 1 shows an amount of variation with the tension of an optical fiber having a diameter of about 125 μm and a reference wavelength of 1550 nm.

As shown in Table 1, the wavelength output from the optical fiber is changed by about 1.32 nm when an amount of change in tension is 100 g, and, when the length of the optical fiber is changed by about 1,000με so that the amount of variation in length is 0.1%, the wavelength is changed by about 1.2 nm.

As described above, if a wavelength change of an optical fiber with respect to amounts of variation in tension and length is used, the strain of the measurement object can be measured.

Thus, when each amount of variation in tension applied to the third and fourth optical fibers 22 and 33 is 400 g, the tension applied to each strand of the third optical fiber 22 is about 100 g and the tension applied to each strand of the fourth optical fiber 23 is about 50 g.

Thus, the wavelength output from the third optical fiber 22 is changed by about 1.32 nm when the variation of tension applied to each strand of the third optical fiber 22 is 100 g, and the wavelength output from the fourth optical fiber 23 is changed by about 0.66 nm when the variation of tension applied to each strand of the third optical fiber 22 is 50 g.

In addition, an amount of variation in length of the third optical fiber 22 is twice that of the fourth optical fiber 23.

Therefore, the wavelength output from the third optical fiber 22 is changed by about 1.32 nm when the variation of tension applied to each strand of the third optical fiber 22 is 100 g, and the wavelength output from the fourth optical fiber 23 is changed by about 0.66 nm when the variation of tension applied to each strand of the third optical fiber 22 is 50 g.

As described above, according to the present invention, the pair of optical fibers having mutually different numbers of strands are installed at both sides by using the connection unit, so that the strain of the measurement object may be measured by using the wavelength variation with the amounts of variations in tension and length of each optical fiber.

In addition, according to the present invention, the fiber Bragg grating sensor is installed to the third optical fiber having the small number of strands so that the measurement sensitivity may be improved.

To the contrary, according to the present invention, the fiber Bragg grating sensor is installed to the fourth optical fiber having the large number of strands to reduce the amount of variation in length, so that the durability of the fiber Bragg grating sensor may be improved.

As described above, according to the present invention, the fiber Bragg grating sensor is installed to one selected from the pair of optical fibers having mutually different numbers of strands, so that the measurement sensitivity and the durability of the strain sensor may be improved.

Meanwhile, although the outer ends of the third and fourth optical fibers drawn out from both sides are depicted in FIGS. 2 and 3, it is preferable to install the side end of the third or fourth optical fiber to which the fiber Bragg grating sensor is installed to be drawn out to an outside.

Of course, when the fiber Bragg grating sensors are installed to the third and fourth optical fibers, the fiber Bragg grating sensors may be installed to allow each side ends of the optical fibers to be drawn out to an outside.

Meanwhile, according to the present invention, in a state that the fiber Bragg grating sensors are applied to the acceleration sensor 10 and the strain sensor 20, a temperature-compensation fiber Bragg grating sensor may be further included to prevent the wavelength from being changed due to variations of refractive indexes of the fiber Bragg grating sensors with a variation in temperature.

Embodiment 3

Figure 4:
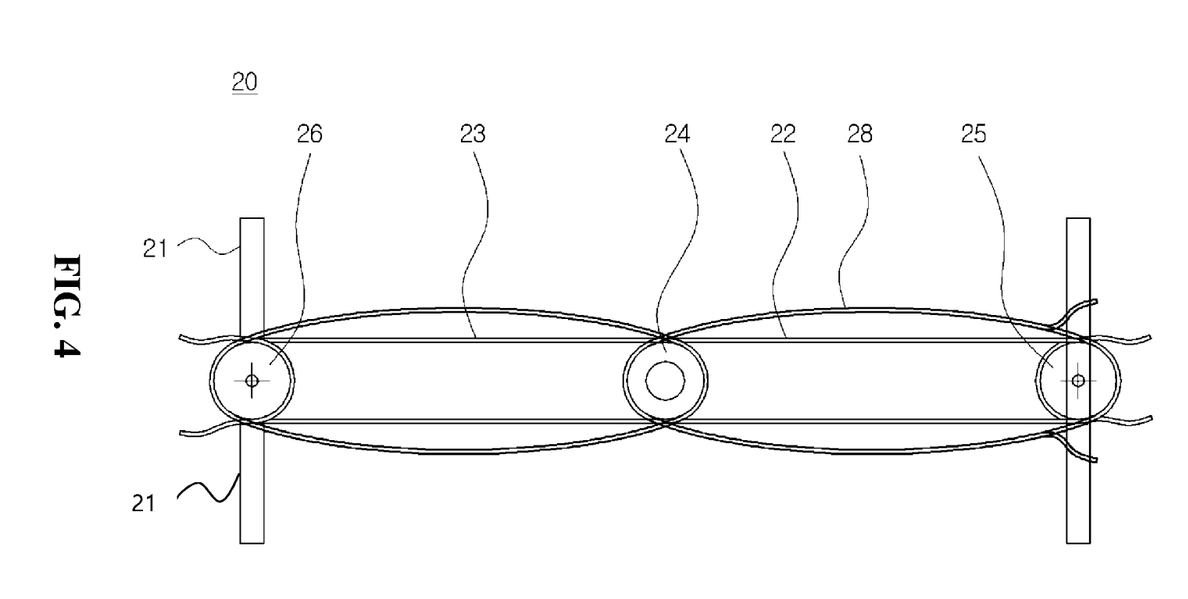
FIG. 4 is a view illustrating the configuration of a strain sensor using a fiber Bragg grating sensor according to a third embodiment of the present invention.

FIG. 4 is a view illustrating the configuration of a strain sensor using a fiber Bragg grating sensor according to a third embodiment of the present invention.

A strain sensor 20 using a fiber Bragg grating sensor according to a preferable embodiment of the present invention has a configuration similar to that of the strain sensor 20 described with reference to FIG. 2 as shown in FIG. 4. However, the strain sensor 20 may further include a fifth optical fibers 28 which are selectively installed to at least two among the connection unit 24 and the third and fourth installation members 25 and 26 and each of which has one side at which a temperature-compensation fiber Bragg grating sensor (not shown) is installed.

In this case, the fifth optical fibers 28 may be prepared separately from the third and fourth optical fibers 22 and 23 and may be installed to the connection unit 24 and the third installation member 25, the connection unit 24 and the fourth installation member 26, or all the connection unit 24 and the third and fourth installation members 25 and 26.

In this case, to prevent the wavelength output due to a variation in tension from being changed, the fifth optical fiber 28 may be loosely installed not to apply tension to at least two of the connection unit 24 and the third and fourth installation members 25 and 26.

Therefore, the temperature-compensation fiber Bragg grating sensor may output a wavelength varying with a variation of temperature without regard to any variations in tension.

Meanwhile, although it is described in the present embodiment that the fifth optical fibers are prepared separately from the third and fourth optical fibers, the third or fourth optical fiber may be additionally and loosely installed once to the connection unit and the installation member and may be changed to install the fiber Bragg grating sensor.

In addition, although it is described that the present embodiment is applied to the strain sensor described in the second embodiment, the present invention may be modified to apply the fifth optical fiber to the acceleration sensor described in the first embodiment such that a temperature compensation value is precisely adjusted.

As described above, according to the present invention, the fifth optical fibers to which the temperature-compensation fiber Bragg grating sensor is prepared may be loosely installed to at least two of the connection unit installed between the pair of attachment members and the third and fourth installation members, such that the compensation value for a variation in temperature is precisely adjusted.

Meanwhile, the present invention may control a length ratio between the third and fourth optical fibers to adjust the strain.

Embodiment 4

Figure 5:
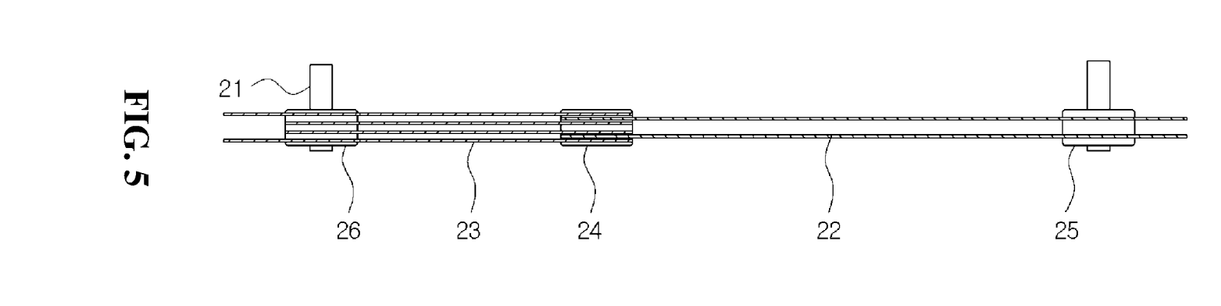
FIG. 5 is a view illustrating the configuration of a strain sensor using a fiber Bragg grating sensor according to a fourth embodiment of the present invention.

FIG. 5 is a view illustrating the configuration of a strain sensor using a fiber Bragg grating sensor according to a fourth embodiment of the present invention.

As shown in FIG. 5, a strain sensor 20 using a fiber Bragg grating sensor according to the fourth embodiment of the present invention has a configuration similar to that described with reference to FIGS. 2 and 3. However, the length ratio between the third and fourth optical fibers 22 and 23 may be changed.

That is, the length ratio between the third and fourth optical fibers 22 and 23 may be controlled to adjust the position of the connection unit 24.

For example, the length ratio between the third and fourth optical fibers 22 and 23 may be variously set to be 2:1, 5:1, 1:2, etc.

In this case, since a total of tension applied to the third and fourth optical fibers 22 and 23 is constant, even though the length ratio between the third and fourth optical fibers 22 and 23 is changed, a total of strain of the third and fourth optical fibers 22 and 23 is always constant.

However, when the length ratio between the third and fourth optical fibers 22 and 23 is increased from 2:1 to 5:1, the absolute value of each actual strain of the third and fourth optical fibers 22 and 23 is increased.

To the contrary, when the length ratio between the third and fourth optical fibers 22 and 23 is decreased, the absolute values of the actual strains of the third and fourth optical fibers 22 and 23 are decreased.

Thus, according to the present invention, the durability of the optical fiber and the fiber Bragg grating sensor may be improved by increasing the length of the third optical fiber and decreasing the length of the fourth optical fiber.

As described above, the length ratio between a pair of optical fibers prepared with mutually different numbers of strands may be control such that the absolute value of an actual strain of each optical fiber is adjusted.

Hereinafter, a method of installing a strain sensor using a fiber Bragg grating sensor according to the present invention will be described in detail with reference to FIGS. 6 and 7.

Figure 6:
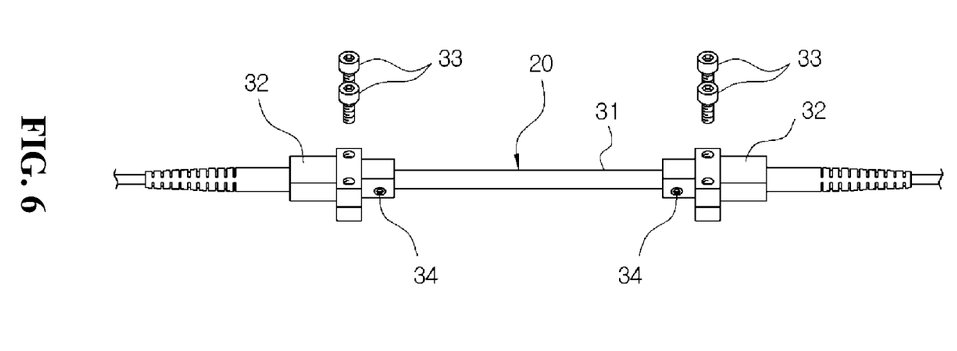
FIGS. 6 and 7 are views of the strain sensor installed to a measurement object.
Figure 7:
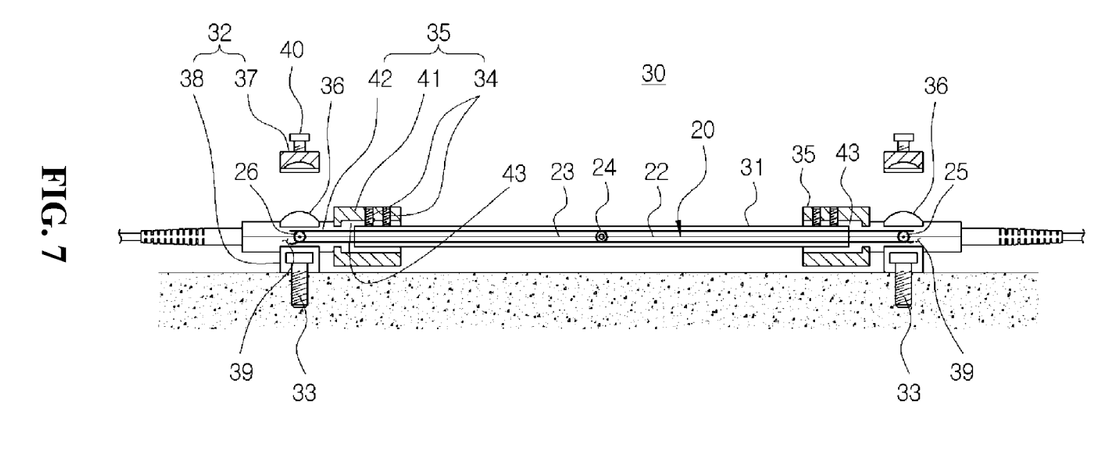

FIGS. 6 and 7 are views illustrating an example of the strain sensor installed to a measurement object.

FIG. 6 shows a strain sensor installed to a measurement object of a flat shape. FIG. 7 shows a strain sensor installed on an uneven attachment surface of a measurement object, a curved surface such as a tunnel, or a bottom surface warped in left and right directions.

As shown in FIGS. 5 and 6, the strain sensor 30 using a fiber Bragg grating sensor according to the present invention may be installed to a measurement object by using a sensor fixing device 30.

The sensor fixing device 30 may include a protective tube 31 containing the strain sensor 20 therein, and a pair of fixing brackets 32 for fixing both ends of the protective tube 31 to the measurement object.

Each of the fixing brackets 32 may be formed with a block having a sectional surface of a substantially crisscross shape when viewed from the top, and both ends of the protective tube 31 may be coupled to side surfaces of the fixing brackets 32 facing each other.

Each fixing bracket 32 may be fixed to a flat shaped measurement object with a fixing bolt 33 which is coupled while passing through the fixing bracket 32 in a vertical direction.

To this end, coupling holes into which the fixing bolts 33 are coupled may be formed on both sides of each fixing bracket 32.

Fixing grooves may be formed on outer ends of the fixing brackets 32, where both ends of the third and fourth optical fibers 22 and 23 provided to the strain sensor 20 are fixed into the fixing grooves through the medium of adhesive.

Therefore, in a state that the strain sensor 20 is disposed in the protective tube 31 of the sensor fixing device 30 configured as described above, a worker couples both ends of the protective tube 31 to the pair of fixing brackets 32.

In this case, setting bolts 34 for protecting the strain sensor 20 and maintaining a set wavelength are coupled to the portions on which the fixing brackets 32 and both ends of the protective tube 31 are coupled to each other.

The setting bolt 34 may be installed only to one of the fixing brackets 32.

In addition, after the pair of fixing brackets 32 are disposed on the measurement object, the fixing bolts 33 are coupled to the fixing brackets 32 through coupling holes formed on the fixing brackets 32.

In this case, a worker loosely installs the setting bolts 34 such that a displacement of the measurement object is sensitively transmitted to the strain sensor 20.

The strain sensor 20 installed to a flat type of a measurement object by using the sensor fixing device 30 may measure a tiny displacement of the measurement object.

In an experiment, it has been confirmed that the strain sensor 20 according to the present invention is able to make a precise measurement at resolution of about 1µε.

Meanwhile, the strain sensor 20 according to the present invention may be installed on an uneven attachment surface of a measurement object, a curved surface such as a tunnel, or a bottom surface warped in left and right directions by using the sensor fixing device 30 shown in FIG. 7.

As shown in FIG. 7, a sensor fixing device 30 has a configuration similar to that of the sensor fixing device 30 described with reference to FIG. 6. However, when being installed in the protective tube 31, a pair of fixing brackets 32 may be coupled to adjust an angle by being rotated in all directions.

To this end, fixing members 35 are coupled to both ends of the protective tube 31, where balls 36 may be coupled to outer ends of the fixing members 35, respectively.

Each of the fixing brackets 32 may include an upper bracket 37 and a lower bracket 38 which are coupled to each other vertically with respect to the ball 36 to adjust the coupling angle.

In this case, each of the fixing members 35 may include a body 41 having a substantially hexahedral shape, and a coupling part 42 connected to an outer end of the body 41 and coupled to the fixing bracket 32 to enable an angle to be adjustable by using the ball 36 coupled to an outer circumference surface.

A coupling space 43 coupled to the protective tube 31 may be provided on an inner side end of the body 41. An outer side end of the coupling space 43 may be spaced apart from the protective tube 31 by about 3 mm, such that the body 41 and the protective tube 31 are prevented from making contact with each other when a displacement of the measurement object occurs due to pressure.

A coupling hole coupled with the coupling part 42 of the fixing member 36 may be formed at a central portion of each ball 36.

The ball 36 may be formed in a full-ring shape and may be formed at one side of the ball with an opening part 39 such that the ball 36 is maintained while being coupled to an outer circumference surface of the coupling part 42.

Thus, after enlarging the opening part 39 to allow both ends of the ball 36 to be away from the center of the opening part 39, a worker couples the ball 36 to an outer side end of the coupling part 42, such that the ball 36 is stably coupled to the coupling part 42 by the elasticity operating to restore the opening part 39 into the original shape.

In this case, the third and fourth installation member 25 and 26 and the attachment member 21 provided on both side ends of the strain sensor 20 may be installed in the coupling parts 42 of the pair of fixing members 35.

Inserting grooves for receiving the ball 36 may be formed on central portions of the upper and lower brackets 37 and 38, and the upper and lower brackets 37 and 38 may be assembled with each other with a coupling bolt 40 coupled into assembly holes formed at both sides.

In addition, a fixing hole may formed on both ends of the lower bracket 38 to be coupled with a fixing bolt 33 such that the lower bracket 38 is fixed to the measurement object.

Thus, a worker may install the pair of lower brackets 38 provided to the sensor fixing device 30 described above onto an uneven attachment surface, a curved surface such as a tunnel, or a bottom surface warped in left and right directions.

In this case, the pair of the lower brackets 38 are fixed to a measurement object with the fixing bolts 33 while being spaced apart from each other by a distance corresponding to that between the pair of balls 36 fixed to the fixing members 35.

In addition, after disposing the upper bracket 37 over the lower bracket 38 and the ball 36, the worker couples the assembly bolt to the upper bracket 37 to assemble the upper and lower brackets 37 and 38 with each other.

As described above, according to the present invention, the strain sensor may be installed onto an uneven attachment surface of an measurement object, a curved surface such as a tunnel, or a bottom surface warped in left and right directions by using the sensor fixing device as well as a flat type measurement object, so that a displacement of the measurement object is precisely measured.

Although the invention made by the present inventor has been described in detail according to the embodiment, the disclosure is not limited to the embodiment and it is understood that various modifications may be made without departing from the essence of the disclosure.

INDUSTRIAL APPLICABILITY

The present invention may be applicable to a technique concerning an apparatus for measuring a displacement using a fiber Bragg grating sensor, which measures a gradient by installing a weight applying unit between a pair of optical fibers having mutually different numbers of strands and controls sensitivity and durability operated in each optical fiber by installing a connection unit.

The invention claimed is:

1. An apparatus for measuring a displacement using a fiber Bragg grating sensor, which is applied to a strain sensor using the fiber Bragg grating sensor, the apparatus comprising:
   a pair of attachment members spaced apart from each other by a predetermined interval;
   a first optical fiber and a second optical fiber, having mutually different numbers of strands, installed between the pair of attachment members in a horizontal direction; and
   a connection unit installed between the first and second optical fibers and fixed at a predetermined position by tension applied to the first and second optical fibers,
   wherein the fiber Bragg grating sensor is installed to one of the first and second optical fibers having mutually different numbers of strands, so that measurement sensitivity and durability are controllable,
   wherein the connection unit is formed of a light metal material or a synthetic resin material in a circular disc shape to prevent a load from being applied to the first and second optical fibers, and
   the first and second optical fibers are wound around an outer circumference surface of the connection unit at mutually different numbers of times and strands.

2. The apparatus of claim 1, wherein a plurality of installation grooves are formed on the outer circumference surface of the connection unit such that friction between each strand of the first and second optical fibers and the connection unit is increased, and
   each of the installation grooves is formed in a V shape or a substantially V shape having a flat lower end.

3. The apparatus of claim 1, wherein the fiber Bragg grating sensor is installed to one of the first and second optical fibers, which has a number of strands less than a number of strands of the other, in order to increase sensitivity of a displacement measurement of a measurement object.

4. The apparatus of claim 1, wherein the fiber Bragg grating sensor is installed to one of the first and second optical fibers, which has a number of strands larger than a number of strands of the other in order to increase durability of the fiber Bragg grating sensor.

5. An apparatus for measuring a displacement using a fiber Bragg grating sensor, which is applied to a strain sensor using the fiber Bragg grating sensor, the apparatus comprising:
   a pair of attachment members spaced apart from each other by a predetermined interval;
   a first optical fiber and a second optical fiber, installed between the pair of attachment members in a horizontal direction; and
   a connection unit installed between the first and second optical fibers and fixed at a predetermined position by tension applied to the first and second optical fibers,
   wherein the fiber Bragg grating sensor is installed to one of the first and second optical fibers having mutually different numbers of strands, so that measurement sensitivity and durability are controllable,
   wherein the strain sensor is installed to a measurement object by using a sensor fixing device, and
   the sensor fixing device comprises a protective tube for containing the strain sensor therein; and
   a pair of fixing brackets for fixing both ends of the protective tube to the measurement object.

6. The apparatus of claim 5, further comprising fixing members coupled to both ends of the protective tube, and
   balls coupled to outer ends of the fixing members, respectively,
   wherein each of the fixing brackets comprises upper and lower brackets coupled to each other at upper and lower positions based on the respective ball, and
   the respective fixing bracket is rotated about the respective ball installed to the respective fixing member such that a coupling angle of the respective fixing member is controllable.

7. A method of controlling sensitivity and durability of an apparatus for measuring a displacement using a fiber Bragg grating sensor,
   wherein the fiber Bragg grating sensor is installed to one of a pair of optical fibers which include mutually different numbers of strands and are installed at both sides of a connection unit, such that measurement sensitivity and durability of the fiber Bragg grating sensor are controllable, the method comprising:
   (a) disposing the connection unit between a pair of attachment members to install the pair of attachment members to the connection unit, wherein the pair of attachment members wound around the connection unit at mutually different numbers of times and strands; and
   (b) installing the fiber Bragg grating sensor to one of the pair of optical fibers, which has a number of strands less than a number of strands of the other, in order to increase sensitivity of a displacement measurement of a measurement object; or
   (c) installing the fiber Bragg grating sensor to one of the pair of optical fibers, which has a number of strands larger than a number of strands of the other, in order to increase durability of the fiber Bragg grating sensor.

* * * * *